US008591335B2

(12) United States Patent
Creaven

(10) Patent No.: US 8,591,335 B2
(45) **Date of Patent: *Nov. 26, 2013**

(54) TECHNIQUES FOR INCENTIVIZED NETWORKING

(76) Inventor: Thomas Creaven, London (GB)

( * ) Notice: Subject to any disclaimer, the term of this patent is extended or adjusted under 35 U.S.C. 154(b) by 1020 days.

This patent is subject to a terminal disclaimer.

(21) Appl. No.: 11/980,861

(22) Filed: Oct. 31, 2007

(65) Prior Publication Data

US 2009/0111553 A1 Apr. 30, 2009

(51) Int. Cl.
*G06F 19/00* (2011.01)

(52) U.S. Cl.
USPC .......... 463/40

(58) Field of Classification Search
USPC .......... 463/16
See application file for complete search history.

(56) References Cited

U.S. PATENT DOCUMENTS

| | | | | |
|---|---|---|---|---|
| 7,787,972 | B2 * | 8/2010 | Schlottmann et al. | 700/91 |
| 2003/0224852 | A1 * | 12/2003 | Walker et al. | 463/20 |
| 2004/0248652 | A1 * | 12/2004 | Massey et al. | 463/42 |
| 2005/0035553 | A1 * | 2/2005 | Lehrer | 273/444 |
| 2005/0194741 | A1 * | 9/2005 | Kowell | 273/269 |
| 2006/0172792 | A1 * | 8/2006 | Vancura | 463/16 |
| 2006/0208419 | A1 * | 9/2006 | Katz et al. | 273/138.1 |
| 2006/0258429 | A1 * | 11/2006 | Manning et al. | 463/16 |
| 2007/0066397 | A1 * | 3/2007 | Nammi et al. | 463/42 |
| 2007/0093298 | A1 * | 4/2007 | Brunet | 463/42 |
| 2007/0105612 | A1 * | 5/2007 | Fotevski | 463/16 |
| 2007/0173324 | A1 * | 7/2007 | Multerer et al. | 463/42 |
| 2007/0281768 | A1 * | 12/2007 | Tyler | 463/9 |
| 2008/0167107 | A1 * | 7/2008 | Goss | 463/16 |
| 2008/0248844 | A1 * | 10/2008 | Gadda et al. | 463/1 |
| 2008/0318655 | A1 * | 12/2008 | Davies | 463/16 |
| 2011/0111855 | A9 * | 5/2011 | Hardy et al. | 463/42 |

* cited by examiner

*Primary Examiner* — Melba Bumgarner
*Assistant Examiner* — Anh Vo V Nguyen
(74) *Attorney, Agent, or Firm* — Frank DeLiguori; Bruce L. Adams

(57) ABSTRACT

Techniques for playing a game of chance providing networking opportunities for large groups of players are described herein. During the game, to qualify for a prize, a player should have one or more partners chosen from the players playing the game. A winner of the prize shares a prize with his/her respective prize partner who would have been selected from at least one partner already chosen by the winner or, based on player's information, by a game computer. The game may be played by groups of on-site players or remote (e.g., online) players, in live and virtual gaming environments or a combination thereof.

17 Claims, 8 Drawing Sheets

TECHNIQUES FOR INCENTIVIZED NETWORKING

BACKGROUND

I. Field

The present disclosure relates generally to the field of entertainment and, more specifically, to techniques for playing a game of chance providing networking opportunities for large groups of players.

II. Background Information

At entertaining public gatherings, whether business or social, many participants find it difficult to approach and interact with one another, even with individuals they know or have met in the past. For example, a participant may lack certain networking skills, be nervous about approaching other participants or starting a conversation, or be concerned about rejection.

On many occasions, it is also difficult for the participants of live or online public gatherings to establish a balance between their desire for a need to network with particular individuals of personal or business interest and a risk of engaging themselves in confusing or harassing situations. In addition, underlying purposes of some of the public gatherings, when they are explicitly announced or advertised, may also lead to additional confusions between some groups of prospective participants, as well as reluctance to take part in the gathering. Such considerations are applicable to a broad orange of public gatherings, including many social, business, professional, dating, and entertainment events.

Games and, specifically, games of chance are forms of entertainment that allow the players to naturally participate together in a gaming environment of a particular game. However, such games often create conditions for competitive rather than entertaining relationships between the participating players. Since during the game the players play against one another, they may have little or no opportunity or excuse for networking or partnering. Moreover, a competitive nature of these games may actually make it more difficult for the players interested in social or business interactions to introduce themselves to one another or interact because such a behavior would contradict or appear contradicting to their personal game-dictated goals of being individually successful (i.e., winning) players.

Therefore, despite the considerable efforts in the art devoted to techniques for using the games of chance for providing networking opportunities for their respective players, further improvements would be desirable.

SUMMARY

Techniques for playing a game of chance providing networking opportunities for large groups of players are described herein.

In one aspect, the disclosure provides a method of playing a game of chance providing networking opportunities for players playing the game. In an embodiment, to qualify for a prize to be awarded to a winner of the game, a player should have one or more partners chosen from the players playing the game, and the winner should share the prize with his/her prize partner. Rules of the game promote networking between the players in a form of a chance of winning the prize as an incentive for the players to communicate with one another and form alliances based on a plurality of personal or business-related interests. A partner is chosen by the respective player or, based on the player's information, by a game computer. The game may be played in live or virtual environments (for example, online) by one or more groups of on-site or remote players.

In another aspect, the disclosure provides a system adapted for facilitating the game of chance.

In yet another aspect, the disclosure provides a computer program product including a computer readable medium having instructions for causing a computer to execute the method of playing a game of chance.

Various other aspects and embodiments of the disclosure are described in further detail below.

The Summary is neither intended nor should it be construed as being representative of the full extent and scope of the present disclosure, which these and additional aspects will become more readily apparent from the detailed description, particularly when taken together with the appended drawings.

Figure 1:
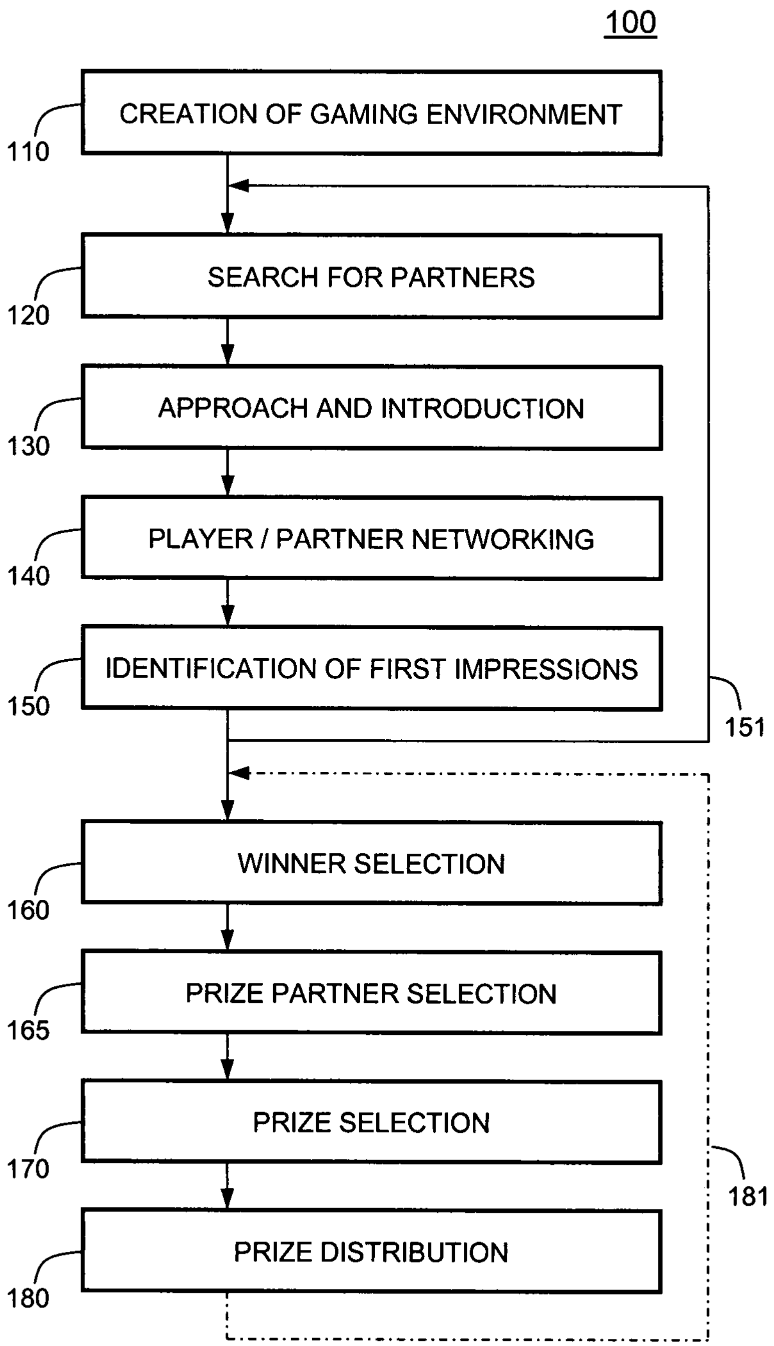
FIG. 1 shows a flow diagram of a method of playing a game of chance providing networking opportunities for players playing the game.

To facilitate understanding, identical reference numerals have been used, where possible, to designate identical elements that are common to the figures, except that suffixes may be added, when appropriate, to differentiate such elements. The images in the drawings are simplified for illustrative purposes and are not depicted to scale. It is contemplated that features or steps of one embodiment may be beneficially incorporated in other embodiments without further recitation.

The appended drawings illustrate exemplary embodiments of the disclosure and, as such, should not be considered as limiting the scope of the disclosure that may admit to other equally effective embodiments.

DETAILED DESCRIPTION

The term "exemplary" is used herein to mean "serving as an example, instance, or illustration." Any embodiment or design described herein as "exemplary" is not necessarily to be construed as preferred or advantageous over other embodiments or designs.

Referring to the figures, FIG. 1 depicts a flow diagram of a method 100 of playing a game of chance providing networking opportunities for large groups of players in accordance with one embodiment of the present disclosure.

At step 110, a sponsor or, alternatively, a producer of a game of chance creates a gaming environment adapted for supporting execution of the game. The sponsor or producer may be a private, corporate or public entity, and the gaming environment generally includes various physical, communicational, and computer means needed for playing the game in a particular setting, such as a public gathering, online, or a combination thereof. In further embodiments, portions of the game may be implemented as elements of board games. Hereafter, the terms "sponsor" and "producer" and the terms "game" and "game of chance" are used interchangeably, respectively.

In embodiments, the created gaming environment is used to promote social or business networking between the players in a form of participation in the game of chance that requires a winner to share his/her prize with a prize partner selected from the players playing the game. The need for a player to have a partner or be a partner of another player to qualify for the prize develops an incentive element for networking (i.e., communications) among the players in a context of a common goal of winning the prize. Herein the term "prize" is broadly used in reference to any incentive for the players to partner up and communicate to one another. During the game, in the pursuit of such a common goal, the players are encouraged to approach one another, introduce themselves, start conversations, and/or reach agreements.

The players may be motivated to get together and establish mutually beneficial alliances based on a plurality of personal or business-related interests, including professional or career consideration, personal attraction and dating situations, and a desire to develop a particular form of a personal or professional relationship, among other reasons. Joint participation in the game creates an environment of incentivized networking where the players are offered multiple opportunities for searching, selecting, and interacting with individuals of interest in a context of an invitation to become their partners, as discussed below in reference to steps 120, 130, and 140.

The sponsor determines or approves rules of the game and appoints a person or persons (collectively referred to herein as an "Organizer") responsible for implementation of the rules and administering game procedures. In some embodiments, the sponsor or the Organizer further appoints one or more judges, i.e., individuals responsible for administering specific portions of the game procedures.

Generally, such a game is provided with a name that reflects networking aspects of the game and reflects interests of a particular player's populace, such as social interactions, dating motivations, interest in establishing professional contacts, and the like. Some illustrative examples of the names include "Partner Up to Party", "Knights and Maidens", "Romeos and Juliets", "Entrepreneurs and Investors", "Sellers and Buyers", "Studs and Stunnas (or Stunners)" and the like. Hereafter, "Knights and Maidens" is illustratively used as a name of the game(s) discussed in reference to FIGS. 1-5, 6A-6B and 7.

In one embodiment, to facilitate contacts and interactions between the players, each player is issued, in a physical or virtual domain or both, a game-tailored player's ID (referred hereafter as a "Passport") and a personalized player's book of tickets including invitation forms for other players to become a player's partner, such tickets also featuring First Impressions sections disposed on the back of Parts 1 and 2 (discussed in reference to FIG. 3) of the tickets.

The Passport and the book of tickets having the First Impressions sections are issued to each player who has paid a game participation fee or for whom the fee was waived by the Organizer or paid by an entity financing a gaming event. Players playing, at least temporarily, the game online or from a remote location are provided with communication links that allow them to pay the fees and obtain access to their "virtual" IDs, books of tickets, and individual tickets, including their First Impressions sections. For example, such players may be provided with website/email addresses or phone numbers of the gaming event.

Hereafter, contents of the Passport, book of tickets, and First Impressions sections are described, unless stated otherwise, in reference to their physical (i.e., paper) versions, which are provided to players playing the game in a physical domain, for example, at a party. However, a player may exercise the same features and functions by using the virtual Passport, book of tickets, and First Impressions sections in a combination with a communication device such as a cellular phone (e.g., voice/text/video-enabled cellular phone having a built-in still or video camera), a wireless or wired personal digital assistant (PDA) or a computer, a digital still or video camera, or a combination thereof. Hereafter, such player's communication devices are collectively referred to as "means of communications".

Figure 2:
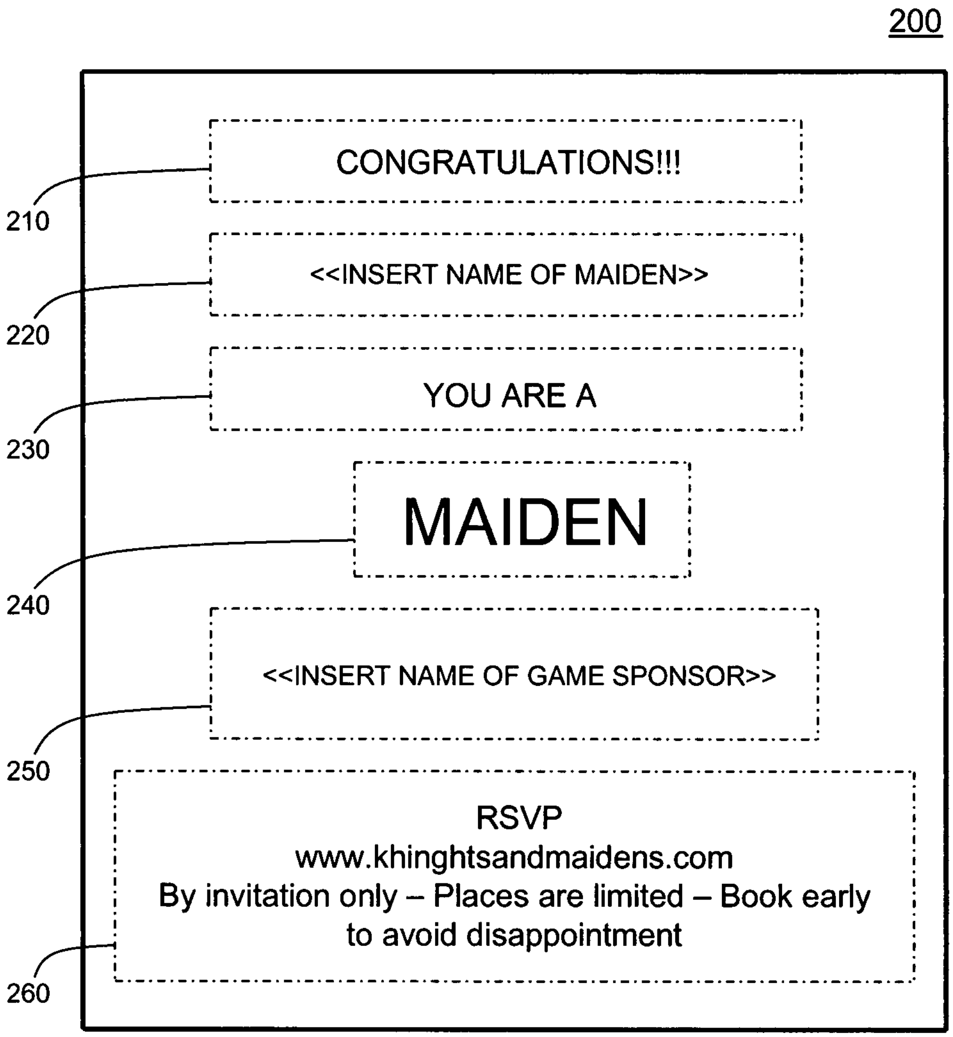
FIG. 2 shows an exemplary embodiment of a Passport identifying a player playing the game of FIG. 1.

Referring to FIG. 2, in one embodiment, a Passport 200 is a document (or, alternatively, a computer or audio form or a video recording) comprising pre-printed fields 210, 230, 240, and 260 and player-identifying (i.e., personalized) fields 220 and 250.

The pre-printed fields 210, 230, 240, and 260 generally include game-related information, notices, or announcements. Correspondingly, the player-identifying fields 220 and 250 are allocated for a name of a player (for example, John Joe or Ann Smith) and description of a playing status of the player (as depicted, "Maiden" or, alternatively (not shown), "KNIGHT"), and the field 250 contains a name of the sponsor of the Maiden (for example, XYZ Inc.).

In alternate embodiments, the Passport 200 may comprise only a portion of such pre-printed or personalized fields, as well as include additional fields (for example, fields containing a player's picture or a sponsor's logo or indicia). During the game played in a live gaming environment, a player should assure that his/her Passport is visible to other players.

Figure 3:
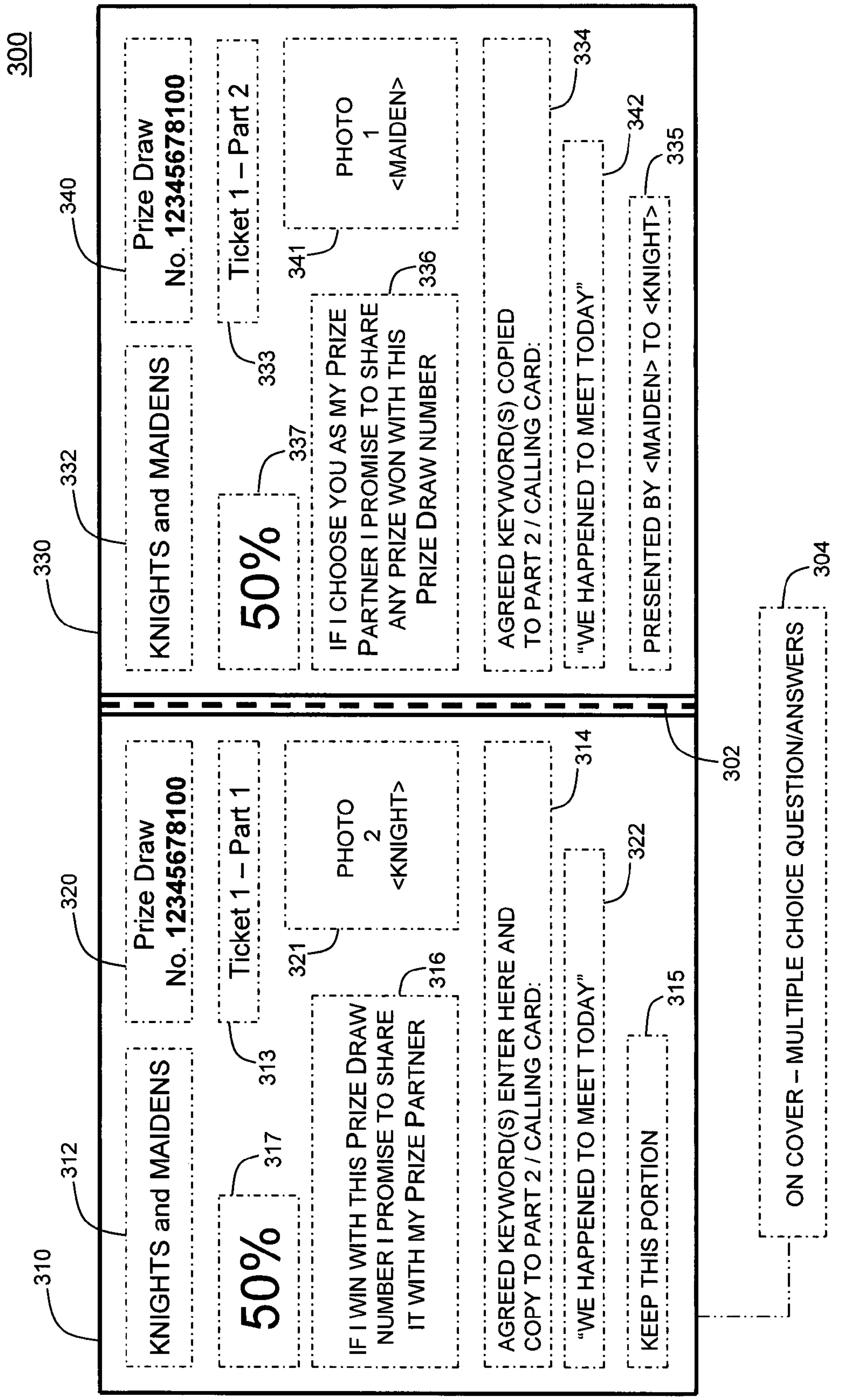
FIG. 3 shows an exemplary embodiment of a player's ticket for playing the game of FIG. 1.

Referring to FIG. 3, in one embodiment, the book of tickets comprises a plurality of tickets 300 (or, alternatively, computer or audio forms or a video recording) each having a first portion 310 and a second portion 330. Together, the portions 310 and 330 constitute a ticket for playing the game and correspond to one chance of winning a prize. A number of tickets 300 in the book of tickets for each game is determined by the Organizer of a particular gaming event and, generally, is in a range from 4 to 10 (e.g., 6 tickets).

In a printed version of the book of tickets, the second portions 330 are detachably connected to the bonded together first portions 310 (illustratively, the portions 310 and 330 are separated by a perforation 302). During the game, the player detaches and forwards the second portion 330 to a partner, as discussed below in reference to step 130.

The Passport 200 may also be provided with a holder (not shown) for keeping or assembling the Parts 1 or 2 of the respective tickets, for example, Parts 1 of the tickets presented by the player (e.g., Maiden) to her partners and Parts 2 of the tickets received by the owner of the holder (i.e., Maiden) from other players as a confirmation of the partnerships with those players. Optionally, such a holder may also be adapted for storing small portable storage devices (e.g., memory cards), player's notes, and the like. Additionally or alternatively, the book of tickets may be provided with a section (not shown) adapted for storing portions 330 of tickets received from other players who invited an owner of the book of tickets to become their partner.

In some embodiments, a cover of the holder or book of tickets contains, physically or electronically, one or more multiple-choice questions 304 (shown in phantom) that, if answered correctly, may allow the owner of the book of tickets to qualify for entrance to the game or some prizes (for example, a question "Who was known as 'The Latin Lover?'" and answers <(1) Casablanca>, <(2) Kilimanjaro>, <(3) Casanova>). Such multiple-choice questions may be the same for all players or, alternatively, randomly selected for at least a portion of the players.

In the depicted embodiment, the first portion 310 of the ticket 300 comprises pre-printed fields 312-317 and player-identifying (i.e., personalized) fields 320-322. The field 312 is allocated for a name of the game, and the field 313 identifies the portion 310 of a particular ticket 300 (illustratively, the ticket No. 1) as a Part 1 of that ticket. The fields 314 and 315 include game-related instructions to the player, and the fields 316 and 317 contain the player's promise to share with the prize partner a prize won by the player (field 316) and the agreed player's portion, in percent, of the prize (field 317).

A field 320 is provided for a player's prize draw number (i.e., player's ID), and a field 321 is provided for the partner's photograph. A field 322 is allocated for keywords (illustratively, "We happened to meet today") that, during the game, are chosen by the player and the partner who receives from the player the second portion 330 of the ticket. Generally, the prize draw number is a unique alphanumeric combination that, in some embodiments, may comprise portions of a player's phone number or name. The entire book of tickets (e.g., all 6 tickets) uniquely share the same prize draw number. All of the partners have a potential stake in any prize won with that prize draw number if they get picked as a prize partner.

Correspondingly, the second portion 330 of the ticket 300 comprises pre-printed fields 332-337 and player-identifying (i.e., personalized) fields 340-342. Contents of the fields 332 and 340 are the same as ones of the fields 312 and 320, respectively, whereas the field 333 identifies the portion 330 as a Part 2 of a particular ticket 300 (as depicted, ticket No. 1). The fields 334 and 335 include game-related instructions to the prize partner, and the fields 336 and 377 contain the player's promise to share with the partner the prize won by the player (field 336) and the agreed partner's portion, in percent, of the prize (field 337). The field 341 is provided for the player's photograph so that the partner can take away a photo of the player that presented that ticket's Part 2, and the field 342 is allocated for the keywords chosen by the player and the partner.

In alternate embodiments, each of the portions 310 and 330 may have additional pre-printed fields or only portions of the abovementioned fields.

Figure 4:
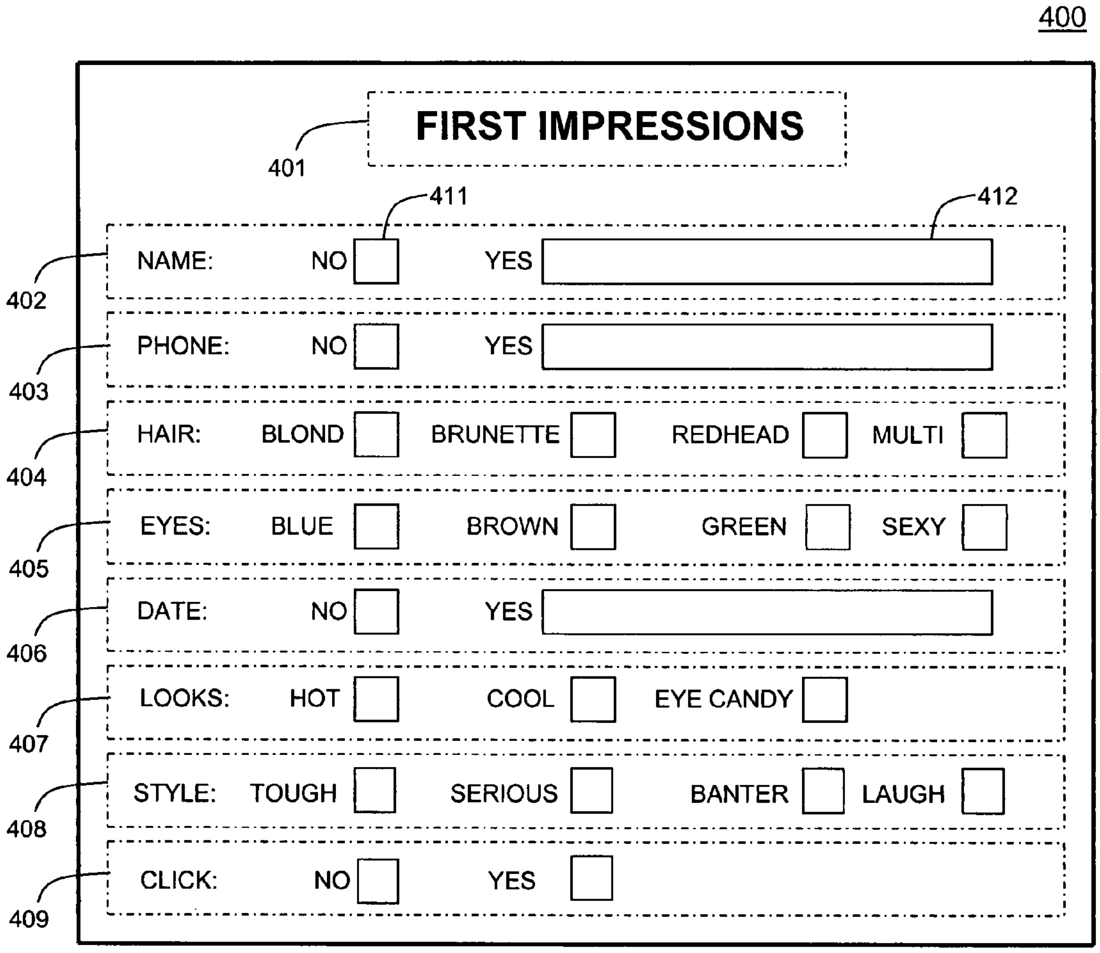
FIG. 4 shows an exemplary embodiment of a First Impressions section disposed on a back of the player's ticket used in the game of FIG. 1.

Referring to FIG. 4, in one exemplary embodiment, a printed version of a First Impressions section 400 is disposed on the back of the Parts 310 and 330 of the ticket 300 and comprises a plurality of pre-printed fields (illustratively, fields 401-409) having check boxes 411, information regions 412, or both.

In the depicted embodiment, the field 401 contains a text (as shown) or image identifying the First Impressions section 400, whereas the fields 402-409 allow a player to keep, in an organized format, records about his/her partner. The pre-printed content of the fields 404-409 is selected by the Organizer of a gaming event. Generally, the content is in coordination with a networking aspect of the game being played, as well as motivations or interests of the player's populace. For example, at a business event one or more of the fields 401-409 may contain information relating to business skills including, but not limited to, marketing, finance, management, creative, legal, etc. In alternate embodiments, the First Impressions section 400 may be provided and executed in computer or audio form or substituted by a player's video or audio recordings.

At step 120, when the game is played in a live gaming environment where direct interactions between the players are possible, a player mixes up and mingles with other players in a search for individuals of his/her particular interest as prospective partners. A mutual need in a partner to qualify for a prize encourages the players to communicate with one another and transforms a burden of approaching a stranger and striking with him/her a conversation into a naturally entertaining element of incentivized networking.

In alternate embodiments, the gaming environment may not allow for such a search, for example, when at least some of the players are remote (i.e., off-site) players or players sitting at a theater, a stadium, and the like. In such gaming environments, based on information derived for the players' Passports and tickets and using a set of criteria pre-defined by the Organizer or, alternatively, the judges, a player is offered or appointed two or more partners.

Generally, the respective determinations and information exchanges may be performed or controlled using a game computer (for example, game computer 710 discussed in reference to FIG. 7 below). During the game, the game computer administers execution of rules of the game and facilitates and monitors game-related communications between the players and between the players and the Organizer or judges.

In some embodiments, the player may choose particular partners from a group of the candidates suggested by the game computer, however, to participate in the game, the player should choose at least one partner. For example, a search and match engine executed by the game computer can randomly allocate one or more partners to the player based on preselected search criteria.

In yet another embodiment, a game can be played simultaneously in the live and virtual gaming environments (i.e., live/virtual gaming environment) by at least two groups of players. In this embodiment, a player playing in a live gaming environment may also be offered or appointed by the game computer, Organizer or judges one or more partners chosen from a group of the remote players playing the game in a virtual gaming environment, as well as remote players may also be suggested partners selected from a group of the on-site players.

During the game, in a preferred embodiment communications between the players and the game computer, Organizer, and judges are performed using a voice/text/video-enabled cellular phone or, alternatively, other respective means of communications. In some embodiments, the game computer may perform some or all functions of the Organizer and/or judges.

At step 130, in the live gaming environment, a player approaches another player whom he/she selects as a prospective partner, introduces him/herself to that player, invites the player to become his/her partner, and forwards to the player the Part 2 of the respective ticket 300, complete with the First Impressions section on the back of the ticket's Part 2. Accordingly, when the game is played in the virtual or live/virtual gaming environment, a prospective partner may be provided with the Part 2 of a ticket 300 of the other player electronically, by the game computer via the respective means of communications.

The rules of the game require that a player always accepts an invitation from the other player to become his/her partner and provides that player with information required for entering in the Part 1 of the player's ticket.

At step 140, the player and the partner complete, together, the keyword section 314 of Part 1 and copy it to section 334 of the Part 2 of the player's ticket. In particular, the player and partner select and enter in the fields 322 and 342 agreed upon keywords, and the partner provides his/her photograph for the field 321, so that the player has a record of what the partner looks like. These interactions may involve operations performed in either physical or virtual domains or both.

For example, the keywords may be entered manually, then pictures of the partner and, optionally, the Parts 1 and 2 of the ticket can be taken using a camera in the player's or partner's cellular phone, and, using the cellular phone, transmitted to the game computer. Alternatively, in the live gaming environment, the filled out Parts 1 and 2 are forwarded to the Organizer or judges. The seeking out of a partner and getting the participants to interact and fill in the keywords as described above is akin to a keen autograph hunter getting that sought after signature.

At step 150, after submitting the Parts 1 and 2 of the ticket 300, the player and the partner are offered time for socializing and/or conversing on subjects of their interests and or motivations, and then each of them is asked to complete, together or separately, the First Impressions sections 400 of the ticket 300. During or after the game, the First Impressions section may be used by the user and the presenter or the Organizer as brief records of interactions that took place in the game. The First Impressions section can also be accomplished by using a video camera in both the player's cellular phone and the video camera in the partner's cellular phone.

Upon completion of the First Impressions section 400, the player and partner are asked to separate temporarily to allow each of them to mingle with other players and search for other suitable partners, thus repeating the steps 120, 130, 140, and 150, as shown with a link 151.

To qualify for a prize, the rules of the game require that a player has at least one partner, as well as may limit a number of the partners, for example, to a number of the tickets 300 in the player's book of tickets (e.g., ten tickets or less). As such, each player is offered a chance to win a prize as a player or as a prize partner of the player who won the prize.

At step 160, a winner (i.e., player who won the prize) is chosen from the players playing the game and who has adhered to the rules of the game. The winner may be chosen, for example, by the picking out of a ticket from a lottery or a raffle type box filled with the covers of all the players' books of tickets containing the book's Prize Draw Number. Alternatively, the winner may be chosen by the organizer, judges, or general public being present at the gaming event. In embodiments, the winner may be chosen using, for example, a prize draw based on the player's prize draw number located in the fields 320 and 340 of the player's ticket 300.

In another embodiment, the winner may be chosen by a game computer via a prize draw number generator. The prize draw numbers located in the fields 320 and 340 of the player's ticket 300 are randomly generated by the game computer and printed on the tickets. These numbers are then used by the game computer to randomly select the winner. In yet another embodiment, mobile phone numbers of players playing the game are stored in the game computer and then used by the prize draw number generator to randomly select a winner based on a randomly selected mobile phone number.

Alternatively or additionally, the prize may be awarded based on the player's answer on the multiple-choice question placed, physically or electronically, on the cover of the player's book of tickets. In yet another embodiment, two or more candidate winners may be offered to answer one or more additional questions asked by the game computer, Organizer, judges, or general public. In another embodiment, the game computer, Organizer, judges, or general public may ask candidate winners or their partners to answer additional questions, make jokes, or practice entertaining performances.

Depending on a type of the gaming environment, the winner and the winner's prize partner may be announced and, consequently, invited to participate in prize selection and distribution events taking place in a physical domain or, using the respective means of communication, in a virtual domain, or both.

At step 160, the prize or, alternatively, a choice to choose from several prizes is announced and offered to the winner, and the winner chooses the prize. Generally, prizes may include various goods, cars, pre-paid vacations for two, and the like, or cash values thereof. In alternate embodiments, depending on a composition of the players' populace, the prizes may also be offered in a form of other incentive elements, such as business or investment opportunities, job offers, scholarships, participation in or tickets to particular events, lottery tickets, and the like.

At step 165, the winner of the prize chooses a prize partner from his/her partners in the game. The winner and the prize partner decide if they are going to share the prize or its cash equivalent and, alternatively, if they are going to go on from this point in the game together or go their separate ways.

At step 170, the prize winner and the prize partner participate in a prize distribution event. To qualify for the prize, a partner may be required to be present, physically or via the means of communications, at the prize distribution event.

If the winner has two or more partners, the prize partner that shares the prize with the winner may be chosen by the winner, game computer, Organizer, judges, or general public.

A winner having no partner or a winner whose partner is absent at the prize distribution event is disqualified. In such situations, the method 100 returns to step 160 (shown in phantom, using a link 181) to determine another winner.

During the game, portions of the game may be displayed on a display available for viewing by the players or general public, as well as broadcasted via a closed or public network (discussed below in reference to FIGS. 6A-6B). For example, images of the players (e.g., photographs posted in the player's tickets or pictures from a profile put together online or via any means of communication by a player), their Passports or tickets, as well as pictures or video clips depicting scenes of portions of method steps of the method 100 may be displayed, broadcasted, or otherwise used by the producer for entertaining or game marketing purposes.

In some embodiments, specific prizes may be awarded to players for certain game-related activities, such as sponsoring other players, becoming a partner for a particular number of players, becoming a first partner, and the like. To qualify for any of such prizes, the winner should also share the prize with his/her prize partner.

In alternate embodiments, some method steps of the method 100 may be performed contemporaneously, in parallel, or in a different order. For example, portions of steps 130, 140, or 150 may be performed contemporaneously or in parallel. Those skilled in the art will readily appreciate that the order of executing at least a portion of other discussed below method steps or portions thereof may also be modified.

Figure 5:
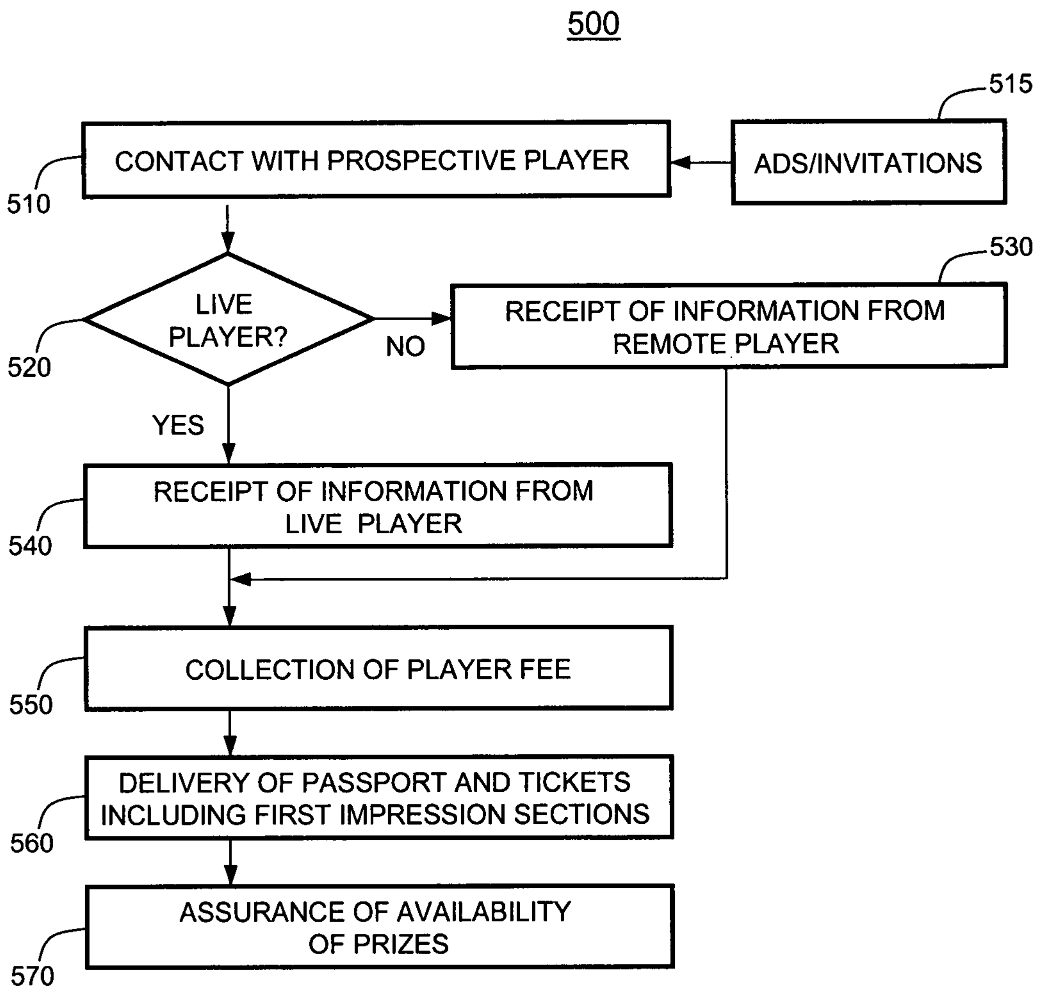
FIG. 5 shows a flow diagram of a method of creating a gaming environment for playing the game of FIG. 1.

FIG. 5 depicts a method 500 of creating a gaming environment for playing the game of chance of FIG. 1 in accordance with one embodiment of the present disclosure.

The method 500 starts at step 510 where a caller (i.e., prospective player) contacts a producer's office by phone or by logging on to a respective website and inquires regarding his/her participation in the game scheduled on a particular date. In some embodiments, the caller may be a recipient of advertisements or personal invitations distributed by the producer's office, as shown with box 515.

At step 520, the method 500 inquires if the caller intends to be a live (i.e., on-site) player. The caller could also book online or over the telephone for the live event. If the query of step 520 is answered negatively, the method 500 proceeds to step 530.

At step 530, the method 500 verifies that remote players can participate in the particular game event, asks the caller to provide personal information needed to issue the Passport and the book of tickets, caller's contact information, and a type of the caller's means for off-site communication, as well as inquires on a caller-preferred form of payment for the book of tickets (e.g., credit/debit card, check, and the like). The player's information is stored in the respective game computer or, alternatively, in a database of the producer's office. When participation of the remote players is not available in the selected game, the caller may be suggested other dates or locations to play the same or other games.

If the query of step 520 is answered affirmatively, the method 500 proceeds to step 540. At step 540, the method 500 verifies that live players can participate in the game, asks the caller to provide personal information needed to issue the Passport and the book of tickets, and a type of the caller's means for on-site communication, as well as inquires on a caller-preferred form of payment for the book of tickets. Player's information is stored in the respective game computer or, alternatively, the database of the producer's office. When participation of the live players is not available in the selected game, the caller may be suggested other dates or locations to play the same or other games. Illustratively, in the depicted embodiment of the method 500, the game in which the caller is interested in may be played by both on-site and remote players.

At step 550, a player fee is collected from the caller using the caller's preferred form of payment. In some embodiments, the caller is offered a fee schedule based on a number of tickets included in his/her book of tickets.

At step 560, the personalized player's Passport and book of tickets complete with First Impressions sections are forwarded to the caller electronically, by mail, or both, and the caller is registered as a player in the respective game event.

At step 560, to assure fiscal legitimacy of the game, the producer's office deposits in an escrow account an amount equal to or exceeding a cash value of the prize(s) intended for distribution during the game. This is also available as a cash alternative for the winner and the prize partner in case they prefer to take the cash instead of the prize.

Figure 6A:
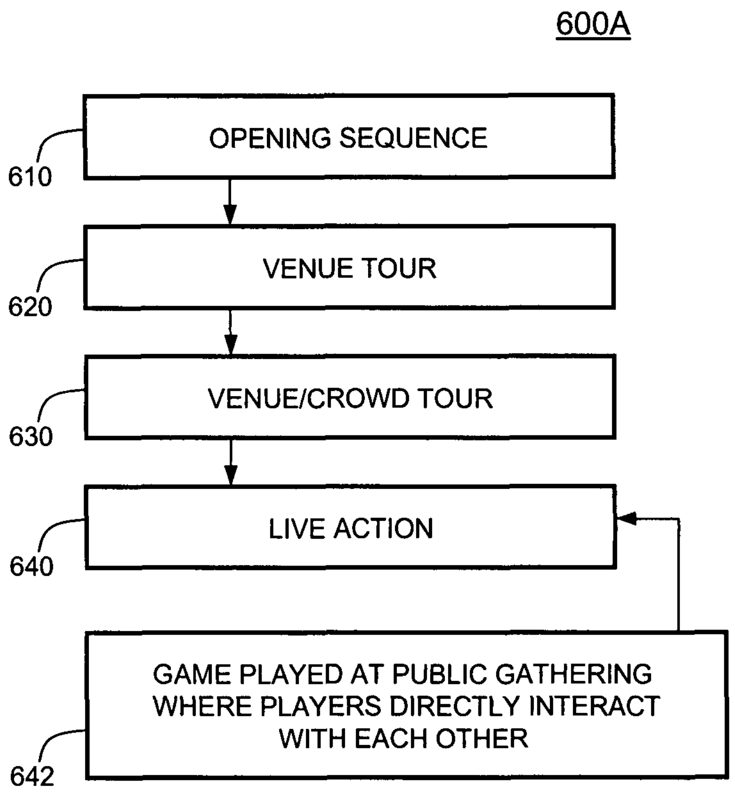
FIGS. 6A-6B show flow diagrams of methods of developing televised versions of gaming environments for playing the game of FIG. 1.
Figure 6B:
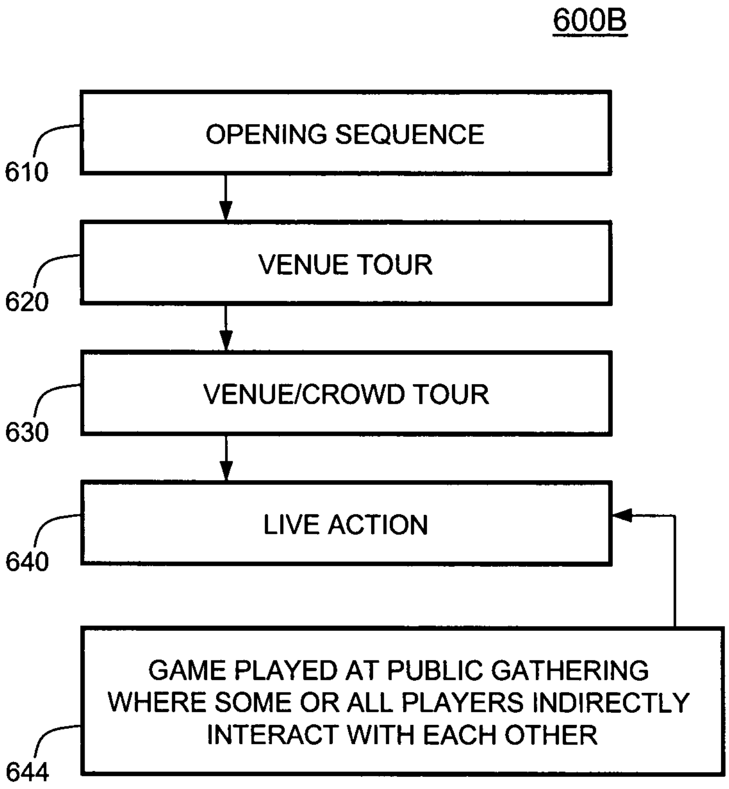

FIGS. 6A and 6B depict methods 600A and 600B, respectively, of developing televised versions of gaming environments for playing the game of FIG. 1 in accordance with one embodiment of the present disclosure.

The methods 600A and 600B start at step 610 where an opening sequence is presented to viewers of the respective television program, for example, a program entitled "Knights and Maidens". In particular, the opening sequence may include video clips depicting portions of step 110, 120, 130, 140, 150, 160, 170, 180 and others not included here of the method 100 or portions of steps 510, 530, 540, 550, 560, or 570 of the method 500, as well as video clips depicting random scenes recorded during preceding "Knights and Maidens" gaming events.

At step 620, a venue tour sequence depicting players and/or spectators assembling for the game, and the playing grounds (for example, a hall/stage, a theater, a stadium, and the like) are shown.

At step 630, broadcasted video clips include images of some on-site or remote players, spectators, or viewers being interviewed on game-related subjects, such as their motivation, interest in opportunities of winning a particular prize or networking with particular individuals, and the like.

At step 640, video clips include recordings of the Organizer and judges being introduced to the players, spectators, or viewers, and scenes of announcing rules of the game and prizes. The video clips also include recordings of scenes of the game played in live, virtual, or live/virtual gaming environments.

In the method 600A, referring to box 642, the game is played at a public gathering. Here all players can directly communicate with one another (for example, at a stage or hall). Therefore, such a game may be played by on-site players only.

In the method 600B, referring to box 644, the game is played at a public gathering where some players can communicate with one another both directly and indirectly, while other players can communicate with one another only indirectly (for example, at a stadium, theater, or online). Such a game may be played by both on-site and remote players or remote players only.

In exemplary embodiments, portions of the methods 100, 500, or 600A-600B may be implemented in hardware, software, firmware, or any combination thereof in a form of a computer program product comprising computer-executable instructions. When implemented in software, the computer program product may be stored on or transmitted using a computer-readable medium adapted for storing the computer-executable instructions, as well as transferring the computer program product from one computer to another.

The term "computer storage medium" refers herein to any medium adapted for storing the instructions that cause the computer to execute the method. By way of example, and not limitation, the computer storage medium may comprise solid-sate memory devices, including electronic memory devices (e.g., RAM, ROM, EEPROM, and the like), optical memory devices (e.g., compact discs (CD), digital versatile discs (DVD), and the like), or magnetic memory devices (e.g., hard drives, flash drives, tape drives, and the like), or other memory devices adapted to store the computer program product, or a combination of such memory devices.

The term "computer communication medium" refers herein to any physical interface adapted to transmit the computer program product from one place to another using for example, a modulated carrier wave, an optical signal, a DC or AC current, and the like means. By way of example, and not limitation, the computer communication medium may comprise twisted wire pairs, printed or flat cables, coaxial cables, fiber-optic cables, digital subscriber lines (DSL), or other wired, wireless, or optical serial or parallel interfaces, or a combination thereof.

Figure 7:
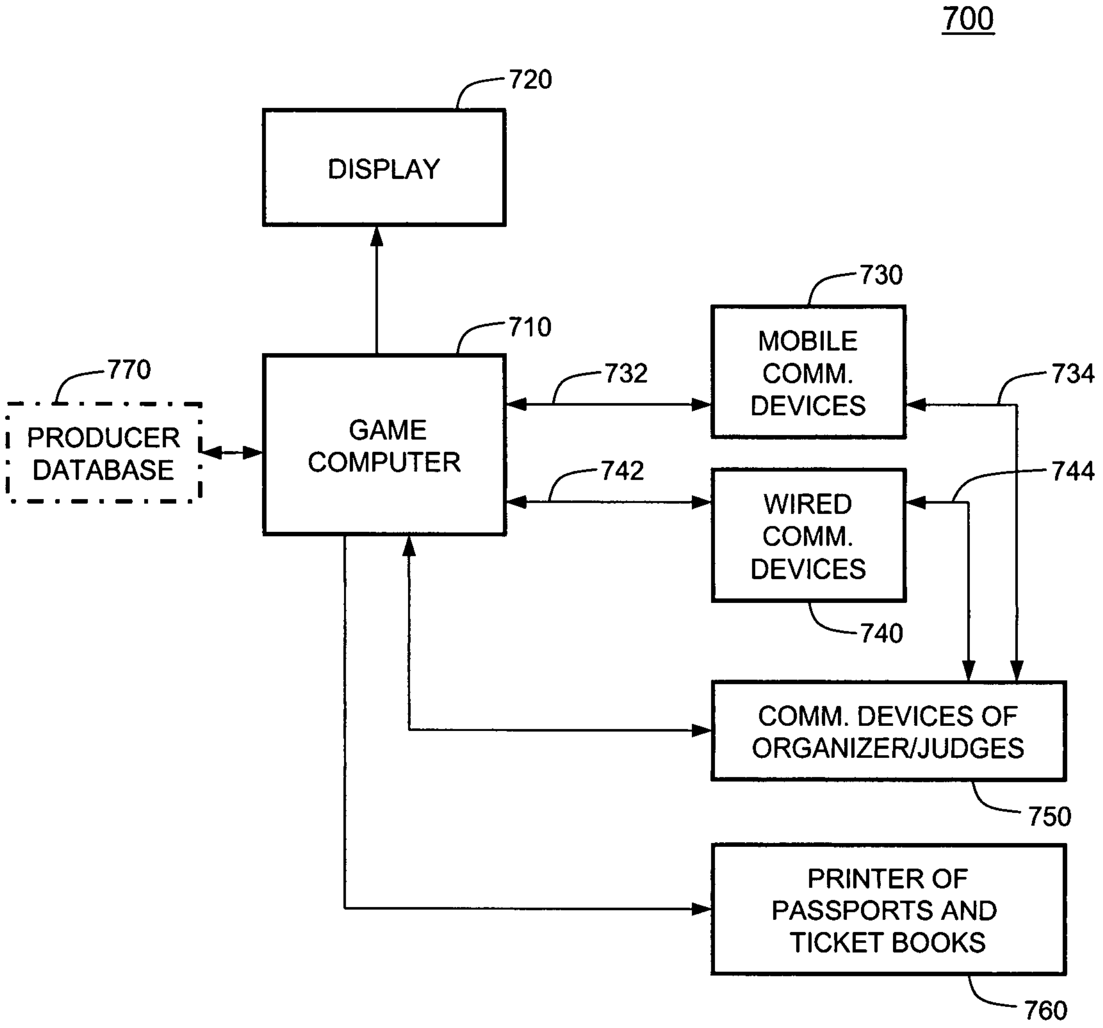
FIG. 7 shows a high-level block diagram of an exemplary system adapted for executing portions of the methods of FIGS. 1, 5 and 6A-6B.

FIG. 7 depicts a high-level block diagram of an exemplary system 700 adapted for performing portions of the methods of FIGS. 1, 5, and 6A-6B in accordance with one embodiment of the present disclosure.

In the depicted embodiment, the system 700 illustratively comprises a game computer 710, a display 720, one or more communication devices 750 available to the Organizer or judges, a printer 760 for printing the player's Passports and tickets, and, collectively, pluralities 730 and 740 of player's mobile and wired communication devices, respectively.

The display 720 is operated by the game computer 710 and, during the game, displays scenes of the gaming environment corresponding to respective method steps of the methods of FIGS. 1, 5, and 6A-6B. The players' mobile and wired devices 730 and 740 are coupled to the game computer 710 via bi-directional communication links 732 and 742 provided by the producer of the game. Alternatively or additionally, on-site and remote players can also communicate to the Organizer or judges via communication bi-directional links 734 and 744. The printer 760 is coupled to the game computer 710 and adapted for printing the player's Passports and tickets, incorporating the First Impressions sections, using player's information stored in the game computer 710 or, alternatively, a database 770 (shown in phantom) of the producer's office, as discussed above in reference to FIG. 5.

Thus, the present disclosure provides techniques for playing a game of chance providing networking opportunities for large groups of players by facilitating contacts and interactions between the players. The techniques create and use a gaming environment to promote social or business networking between players of the game of chance in a form of participation in the game of chance that requires a winner to share his/her prize with a prize partner selected from the players playing the game. The need for a player to have a partner or be a partner of another player to qualify for the prize develops an incentive element for networking (i.e., communications) among the players in a context of a common goal of winning the prize. During the game, in the pursuit of such a common goal, the players are encouraged to approach one another, introduce themselves, start conversations, and/or reach agreements.

The techniques described herein motivate the players to get together and establish mutually beneficial alliances based on a plurality of personal or business-related interests, including professional or career consideration, personal attraction and dating situations, and a desire to develop a particular form of a personal or professional relationship, among other reasons. Joint participation in the game creates an environment of incentivized networking where the players are offered multiple opportunities for searching, selecting, and interacting with individuals of interest in a context of an invitation to become their partners. These techniques allow players to mix up and mingle with other players in a search for individuals of his/her particular interest as prospective partners. The mutual need in a partner to qualify for a prize encourages the players to communicate with one another and transforms a burden of approaching a stranger and striking with him/her a conversation into a naturally entertaining element of incentivized networking.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A computer program product including a non-transitory computer readable medium having instructions for causing a computer, for playing a game of chance providing networking opportunities for players playing the game, to execute a method, the method comprising:

requiring each of the players playing the game to partner up with at least two partners each selected from the other players playing the game as a condition for each player playing the game to become an eligible winner of the game to win a prize;

selecting a potential prize winner from among the players playing the game and determining that the selected potential prize winner is an eligible prize winner of the prize by confirming that the selected potential prize winner has met the condition of partnering up with the at least two players;

requiring the selection of only one of the at least two partners as a prize partner after the selection of a prize winner;

and requiring the selected prize winner to share the prize won with the selected prize partner as conditions for the eligible prize winner to receive the prize.

2. The computer program product according to claim 1; wherein the non-transitory computer readable medium has instructions for further causing the computer to execute the method comprising: facilitating access to means for playing the game at a public gathering, online, or a combination, thereof.

3. The computer program product according to claim 1; wherein the non-transitory computer readable medium has instructions for further causing the computer to execute the method comprising:

allowing one or more of the players playing the game, an organizer of the game, at least one judge appointed by the organizer, or a matchmaking computer program to choose the corresponding at least two partners for each player playing the game; and requesting each player playing the game to provide player-identifying information to the corresponding at least two partners.

4. The computer program product according to claim 1; wherein the non-transitory computer readable medium has instructions for further causing the computer to execute the method comprising: facilitating contacts and interactions among the players playing the game to allow each of the players playing the game to partner up with the at least two partners.

5. The computer program product according to claim 1; wherein the non-transitory, computer readable medium has instructions for further causing the computer to execute the method comprising: providing each of the players playing the game with a player's book of tickets including invitations for other players to become one of the at least two partners.

6. The computer program product according to claim 5; wherein the non-transitory computer readable medium has instructions for further causing the computer to execute the method comprising: allowing each of the players playing the game to invite other players playing the game to become the at least two partners by forwarding to the invited player a preselected portion of the player's book of tickets corresponding to an invitation for the invited player to become one of the at least two partners; and requiring the invited player to accept the invitation to become one of the at least two partners.

7. The computer program product according to claim 1; wherein the steps of the executed method offer each of the players playing the game multiple chances to win the prize either as a selected prize winner or as a selected prize partner.

8. A computer program product including a non-transitory computer readable medium having instructions for causing a computer, for playing online a game of chance providing networking opportunities for players playing the game, to execute a method, the method comprising:

administering execution of rules of the game using the computer;

providing communication links between the computer and communication devices of the players;

choosing from the players playing the game at least two partners for each player playing the game using a matchmaking computer program utilizing portions of game-related data provided by the player, the choosing of the at least two partners comprising a condition for each player playing the game to become an eligible winner of the game to win a prize;

selecting a potential prize winner from among the players playing the game and determining that the selected potential prize winner is an eligible prize winner of the prize by confirming that the selected potential prize winner has met the condition of the choosing of the at least two partners;

requiring the selection of only one of the at least two partners as a prize partner after the selection of a prize winner; and requiring the selected prize winner to share the prize won with the selected prize partner as conditions for the eligible prize winner to receive the prize.

9. The computer program product according to claim 8; wherein the non-transitory computer readable medium has instructions for further causing the computer to execute the method comprising:

providing each of the players with at least one of an online player's ID or an online player's book of tickets including invitations for each of the players to become one of the at least two partners; and facilitating broadcasting portions of the game online or on a television-enabled network.

10. The computer program product according to claim 9; wherein the non-transitory, computer readable medium has instructions for further causing the computer to execute the method comprising:

requesting each of the players to provide portions of the game-related data; and requiring each of the players to accept one or more invitations during the game to become one of the at least two partners.

11. The computer program product according to claim 8; wherein the steps of the executed method offer each of the players playing the game multiple chances to win the prize either as a selected prize winner or as a selected prize partner.

12. A computer program product including a non-transitory computer readable medium having instructions for causing a computer, for playing a game of chance providing networking opportunities for on-site players and remote players, to execute a method, the method comprising:

providing communication links between at least one of the computer or an organizer of the game and communication devices of the players;

administering via the communication links execution of rules of the game using the computer, the organizer of the game, or both, the game being played at a public gathering, online, or a combination thereof;

selecting from among the players playing the game at least two partners for each player playing the game as a condition for each player playing the game to become an eligible winner of the game to win a prize;

selecting at least one potential prize winner from among the players playing the game and determining that the selected potential prize winner is an eligible prize winner of the prize by confirming that the selected potential prize winner has met the condition of partnering up with the at least two partners;

requiring the selection of only one of the at least two partners as a prize partner after the selection of a prize winner; and requiring the selected prize winner to share the prize won with the selected prize partner as conditions for the eligible prize winner to receive the prize.

13. The computer program product according to claim 12; wherein the non-transitory computer readable medium has instructions for further causing the computer to execute the method comprising: providing each of the players with at least one of a player's ID and a player's book of tickets including invitations for each of the players to become one of the at least two partners, each of the player's ID or the player's book of tickets being available in a physical domain, a virtual domain, or both.

14. The computer program product according to claim 13; wherein the non-transitory computer readable medium has instructions for further causing the computer to execute the method comprising:

allowing one of the players playing the game, an organizer of the game, at least one judge appointed by the organizer, or a matchmaking computer program to select the at least two partners; and requesting each player playing the game to provide player identifying information to each of the corresponding at least two partners.

15. The computer program product according to claim 12; wherein the non-transitory computer readable medium has instructions for further causing the computer to execute the method comprising: facilitating broadcasting portions of the game online or on a television-enabled network.

16. The computer program product according to claim 12; wherein the steps of the executed method offer each of the players playing the game multiple chances to win the prize either as a selected prize winner or as a selected prize partner.

17. A computer program product including a non-transitory computer readable medium having instructions for causing a computer to execute a method, comprising the steps:

creating a gaming environment used to promote social or business networking opportunities between players in a form of participation in a game that requires each player to compete against one another for a chance to be selected as a prize winner of the game and win a prize;

allowing for each of the players playing the game to partner up with at least two partners selected from among the other of the players playing the game to provide an opportunity for each of the players playing the game to win the prize either by being selected as the prize winner or by being one of the at least two partners of the selected prize winner;

selecting a prize winner of the game from among the players playing the game that have partnered up with the at least two partners; and requiring the selected prize winner to share the prize won with one of the at least two partners of the selected prize winner as a condition for the selected prize winner to receive the prize;

wherein the non-transitory computer readable medium has instructions for further causing the computer to execute the method comprising the additional step of requiring the selection of only one prize partner from the at least two partners of the selected prize winner after the selecting step and before the requiring step; and wherein the requiring step further comprises requiring the selected prize winner to share the prize won with the selected prize partner as a condition for the selected prize winner to receive the prize.

* * * * *